United States Patent [19]

Gino et al.

[11] Patent Number: 5,580,372
[45] Date of Patent: Dec. 3, 1996

[54] INK COMPOSITION FOR INK-JET PRINTING

[75] Inventors: Luigina Gino, Turin; Laura Frera, Bologna; Norma Giordano, Feletto, all of Italy

[73] Assignee: Olivetti-Canon Industriale S.p.A., Turin, Italy

[21] Appl. No.: 490,706

[22] Filed: Jun. 15, 1995

[30] Foreign Application Priority Data

Jun. 28, 1994 [IT] Italy .................. 94A000528

[51] Int. Cl.$^6$ .................................. C09D 11/02
[52] U.S. Cl. .................. 106/20 R; 106/22 R; 106/23 R
[58] Field of Search .................. 106/20 R, 22 R, 106/23 R

[56] References Cited

U.S. PATENT DOCUMENTS

| | | | |
|---|---|---|---|
| 4,229,747 | 10/1980 | Hwang | 106/22 H |
| 4,959,661 | 9/1990 | Buxton et al. | 106/23 C |
| 5,019,166 | 5/1991 | Schwarz | 106/20 D |
| 5,101,125 | 4/1991 | Kruse et al. | 106/30 R |
| 5,114,478 | 5/1992 | Auslander et al. | 106/20 B |
| 5,196,057 | 3/1993 | Escano et al. | 106/20 D |
| 5,211,747 | 5/1993 | Breton et al. | 106/20 R |
| 5,290,348 | 3/1994 | Auslander | 106/20 R |

*Primary Examiner*—Helene Klemanski
*Attorney, Agent, or Firm*—Banner & Allegretti, Ltd.

[57] ABSTRACT

This invention concerns an ink composition for thermal ink-jet printing consisting of an aqueous solution, a co-solvent, a dye, a pH regulator, a viscosity modifier, a biocide and a mixture of three non-ionic surface-active agents, one of which is diethylene glycol mono-hexyl ether and the other two are fatty ethoxylate alcohols. This ink composition allows drying times to be reduced to under 2 seconds, gives the printing high water resistance and permits use of the papers known as "recycled" with very good quality printing results, without in any way impairing storage capability, operation and endurance of the printhead.

26 Claims, No Drawings

INK COMPOSITION FOR INK-JET PRINTING

TECHNICAL FIELD

This invention concerns an ink composition for ink-jet printing, and in particular for thermal type ink-jet printing, in which an image is formed on a medium by the deposition of droplets of ink expelled by a printhead through one or more nozzles following application of an electric signal to an electrothermal transducer.

BACKGROUND ART

The technique employed in this particular type of printing technology (Thermal Ink-Jet, generally abbreviated TIJ) is well known and is described in numerous publications and Patents; in short, the TIJ technology uses thermal energy to expel droplets of ink towards the paper.

The energy is supplied by a resistor which, located at the bottom of an expulsion chamber, brings the ink situated above it to boiling point; the gaseous bubble thus formed pushes the ink above until it is expelled through a nozzle on to the paper. During the expulsion process, a meniscus of liquid is formed in the region of each nozzle which, by breaking and reforming again, regulates proper formation and expulsion of the droplet of ink.

The ink is contained in a ink reservoir, including for example a porous medium, from which it flows in controlled manner towards the expulsion chamber; the reservoir may be an integral part of the head or may be a separate object, connecting to the printhead, as in the case of the refillable heads.

In the TIJ technology specific, specially formulated inks are used to offer a plurality of precise requirements such as, for example, the following:

1. chemical/physical properties suitable for the technology in question, i.e. pH between 7.5 and 8.5, viscosity varying from 1 to 5 mPa×second @25° C., surface tension ranging from 25 to 50 dyne/cm @25° C., 2. complete thermal stability so as not to form insoluble residues on the resistor element during the heating process, 3. capable of producing high quality images on the widest range of papers and, in general, on various print media, 4. good properties of interaction (fixing) with the print medium and therefore good performance in terms of resistance to water and light, 5. drying times allowing manipulation of the sheet immediately after printing, 6. perfect operation of the printhead all throughout the product's life, 7. stability in time from the chemical/physical and microbiological viewpoints, 8. completely compatible with the other materials comprising the printhead, 9. absolutely safe to use, in consideration of both the user and the surrounding environment.

Ink compositions are known in the technique that possess the above properties to varying degrees, such as, for example, those described in the U.S. Pat. Nos. 5,098,476; 5,106,416; 5,156,675; 5,165,968 and 5,188,664.

However, as all these inks are formulated with an aqueous base and dyes that are soluble in the base, the drying speed and water resistance are not always completely satisfactory even when the print medium (paper) used is of good quality; then when coming to print on types of paper such as, for example, "recycled" papers, the print quality that is obtained from the known inks is not satisfactory.

With particular regard to drying speed, it is known that the inks typically used in this type of technology are characterized by a water content of about 90% which, though print quality and optical density are good, inevitably leads to lengthy drying times.

Drying time, in fact, is essentially linked to the speed of evaporation and penetration in the print medium for like quantities of ink; the solution in which the amount of ink expelled is reduced and smaller droplets are used means that drying time decreases but at the same time leads to undesirable reductions of optical density and, more generally, of contrast on the medium.

However, different formulations are known in which evaporation speed is increased, for example by adding to the ink large amounts of volatile substances, typically short-chain alcohols, but this solution also has the drawback that optical density is greatly diminished.

Also, addition of these substances often results in decreased decap time; decap time is the amount of time elapsing before the ink, on exposure to air in the region of the printhead nozzles, solidifies and can no longer be expelled or is not expelled properly. The above-mentioned substances, which greatly increase vapor pressure of the ink, have a negative impact on this factor, which is extremely important for the operation of ink-jet printheads.

Other formulations are also known that promote an increase in the amount of penetration, obtained by the addition of surface-active agents; however, in this case, as well as a sharp decrease in optical density, print quality is also often poorer in terms of definition, of feathering (i.e. the tendency of the ink to spread through the paper fibers) and pass-through (the phenomenon wherein the ink passes right through the sheet of paper so that the printed characters are also visible from the rear side of the sheet). Surface-active agents, by lowering the surface tension of the ink, can also result in deterioration of the meniscus formed in the expulsion phase.

As regards water resistance, using dyes that are soluble in water, though this on the one hand guarantee stability of the ink over long periods without any precipitations forming, on the other hand entails poor resistance of the dyes in question to water.

As a solution to this problem, use was proposed of inks containing not dyes soluble in water but pigments which, as is known, are absolutely insoluble in water. These pigmented inks, however, have two drawbacks: stability over time of the pigment dispersion and drying time.

Stable dispersions, in fact, require use of an amount of co-solvent which inevitably greatly impairs drying time. Moreover, the addition of surface-active agents, as well as being critical for the reasons already examined regarding water-soluble dyes, is also a factor having a destabilizing effect on pigment dispersions (as illustrated, for example, in U.S. Pat. No. 5,169,436).

A final critical aspect regarding the inks known today, as mentioned earlier, derives from the possibility of using a wide range of print papers, for example recycled papers, produced not from virgin raw materials but from salvage materials.

This feature has recently become particularly important. Whereas the ink-jet printer market up to now has been geared towards use of plain papers, with which the current inks provide average-to-good quality printing on a wide range of papers marketed as "Xerographic" paper (i.e. originally intended for the market of photocopiers using the Xerographic technology), the recent spread of these recycled papers together with the increased use of laser printers (on which, as is known, use of recycled papers presents no particular difficulties) has created new expectations among users of ink-jet printers as well.

The problem of using recycled papers has not yet been fully solved from the viewpoint of formulating valid inks for ink-jet printers, for it is true that the current inks produce an unacceptable level of print quality on this type medium, mainly because of interaction with the fibers of the paper which leads to extensive "feathering" and a conspicuous loss of definition.

The current situation can be best be illustrated by way of two examples of ink compositions, identified as "Standard 1" and "Standard 2", which represent the state of the art, and their principal properties.

| Ink composition "Standard 1" | |
|---|---|
| Diethylene glycol | 5.0% by weight |
| Food Black 2 | 3.0% by weight |
| Surfynol 104 E | 0.05% by weight |
| Phosphate buffer | 2.5% by weight |
| Preventol D6 | 0.1% by weight |
| Deionized water | 89.35% by weight |

This example has the following properties (significance of these properties and how they are measured will be described in detail later):

| pH | 8 |
|---|---|
| surface tension | 44.5 dyne/cm |
| viscosity | 1.3 mPa × s |
| drying time | 80 s |
| water resistance | DL* = 27.0 |
| "feathering" | |
| on Xerographic paper | 5 |
| on recycled paper | 1 |
| definition | good |
| print quality on recycled paper | very poor. |

| Ink composition "Standard 2" | |
|---|---|
| Diethylene glycol | 5.0% by weight |
| ProJet Fast Black 2 | 0.5% by weight |
| Bayscript Schwarz N01 | 2.0% by weight |
| Surfynol 104 E | 0.05% by weight |
| Phosphate buffer | 2.5% by weight |
| Preventol D6 | 0.1% by weight |
| Deionized water | 89.85% by weight |

It has the following properties:

| pH | 8 |
|---|---|
| surface tension | 43.0 dyne/cm |
| viscosity | 1.3 mPa × s |
| drying time | 70 s |
| water resistance | DL* = 3.8 |
| "feathering" | |
| on Xerographic paper | 5 |
| on recycled paper | 1 |
| definition | good |
| print quality on recycled paper | very poor. |

From the foregoing examples, it is clear, as previously stated, that drying time, water resistance and usability of recycled papers represent a problem with the current inks.

SUMMARY OF THE INVENTION

The scope of this invention is to define the composition of an ink for thermal ink-jet printing that allows drying time to be reduced, permitting the printed sheet to be handled immediately, and at the same time ensuring high quality printing, high definition and high level optical density.

Another scope of this invention is to define the composition of an ink for thermal ink-jet printing that considerably improves the water resistance of dyes that are soluble in water.

A futher scope of this invention is that of defining the composition of an ink for thermal ink-jet printing with which very high quality printing can be obtained even when the types of paper used as the print medium are of lower quality than Xerographic papers, more particularly, when recycled paper is used.

A further scope of this invention is that of defining the composition of an ink for thermal ink-jet printing that permits normal functioning of the printhead all through its effective life, avoiding the formation of insoluble crusts on the electrothermal transducer that provides the energy for expulsion of the drop of ink.

These scopes are achieved by using an ink for thermal ink-jet printing, with the composition as defined in the main claim.

These and other features of the invention will be evident in the description that follows of preferred embodiments, provided by way of example without limiting the scope to any extent.

DESCRIPTION OF THE PREFERRED EMBODIMENTS

The inks for thermal ink-jet printing are generally composed of:
1. an aqueous solution,
2. a solvent, or better a mixture thereof, soluble in the water with a vapor pressure lower than that of the water (often termed a co-solvent),
3. a dye, or mixture thereof, soluble in the co-solvent,
4. a surface-active agent, or mixture thereof,
5. a pH regulator (otherwise called a buffer),
6. a viscosity modifier,
7. a biocide.

The specific composition of the ink described in this invention envisages use of the following substances, in the percentages stated:

1. AQUEOUS SOLUTION.

Consisting of water deionized at 18 Mohm, used in percentages ranging from 70 to 90%, preferably between 75 and 85%.

2. CO-SOLVENT.

Consisting of organic solvents soluble in water, characterized by their high boiling points and low vapor pressure, examples being: glycols with low molecular weight such as ethylene glycol, diethylene glycol, triethylene glycol, propylene glycol, polyethylene glycol 200 (commercially known as Carbowax 200), pentanediol, hexanediol, etc; glycol ethers soluble in water such as methyl-, ethyl-, butyl cellosolve, methyl-, ethyl-, butyl carbitol, etc.; glycerol, 2-pyrrolidone, N-methyl-2-pyrrolidone, N-(2-hydroxyethyl)-2-pyrrolidone.

Use of one of the foregoing solvents or a mixture of them is justified both by the need for low levels of evaporation of the ink in the region of the nozzles over even lengthy periods of inactivity of the print-head and the need to improve the solubility property of the dye in the aqueous solution.

The organic solvent is used in percentages ranging from 1 to 10% and preferably between 2 and 7%, guaranteeing low levels of evaporation of the ink in the region of the nozzles and not impairing performance of the ink in terms of drying time.

3. DYE.

Consisting of dyes with a solubility in water of more than 4%, among which are the black dyes Food Black 2, mixture of azodyestuff, commercially known as "Bayscript Schwarz N01" (Registered Trade Mark of Bayer), C.I. Direct Black 168, disazo dyestuff, commercially known as "Projet Fast Black 2" (Registered Trade Mark of Zeneca).

To produce colored inks (and in particular, the colors cyan, yellow and magenta), good use may be made of dyes such as Acid Blue 9, Direct Blue 86, Direct Blue 199, Acid Yellow 23, Direct Yellow 86, Acid Red 52 and Acid Red 249.

These dyes have been used in percentages ranging from 0.5 to 4%, preferably between 2.0 and 3.5%.

4. SURFACE-ACTIVE AGENT.

The surface-active system used in this invention consists of 3 non-ionic, surface-active agents, more particularly:

a) 1 surface-active agent with high HLB, registering between 16 and 18 on the scale of Griffin's Hydrophile-Lypophile Balance;

b) 2 surface-active agents with a lower HLB, of between 10 and 14 on the Griffin scale.

In particular, pairs of surface-active agents with different HLB values are used with the aim of stabilizing the third surface-active agent in aqueous solutions. The pair of stabilizer surface-active agents is selected from among the fatty ethoxylate-alcohols or the nonyl-phenol-ethoxylate-alcohols: the preference is for the fatty ethoxylate-alcohols, especially the family of polyethylene glycol dodecyl and hexadecyl ethers, commercially known as "Brij" (Registered Trade Mark of Atlas Powder), used in percentages ranging from 0.5% to 3%, preferably between 0.5 and 2%.

The third surface-active agent is the diethylene-glycol mono-hexyl ether, used in percentages ranging from 1 to 15%, preferably between 2 and 8%.

This system of 3 surface-active agents produces surface tensions of between 25 and 45 dyne/cm, preferably between 25 and 38 dyne/cm and even more preferably between 28 and 34 dyne/cm.

The mix of 3 surface-active agents employed in the invention is stable in time and compatible with TIJ printing, and does not have a negative influence on formation of the meniscus during expulsion of the droplet of ink.

5. BUFFER.

Acts as a pH regulator, keeping the pH in the desired range: compounds good at doing this are phosphates, borates, carbonates, sodium acetates, potassium acetates, ammonium acetates.

6. VISCOSITY MODIFIER.

The viscosity modifier was selected from among those compatible with TIJ type printing; the following compounds in particular may be used for this purpose: polyvinyl pyrrolidone, polyglycols of high molecular weight, amides.

7. BIOCIDE.

Commercially available biocides are used; particularly used is a mix of semyphormal glycol and isothiazolinons (Preventol D6, Registered Trade Mark of Bayer) and 1,2 benzoisothiazolin-3-on (Proxel, Registered Trade Mark of ICI).

Different ink compositions were prepared by the inventors, with components and the percentages employed varying as described above; the chemical and physical properties of each ink composition were set down initially by reading and recording the values of pH, surface tension and viscosity, measured using the following instruments:

a) pH—measured using a Metrohm pHmeter (mod. 654), b) viscosity—measured @25° C. with a Contraves viscometer (mod. 115) and expressed in mPa×second, c) surface tension—measured @25° C. with a Krüss* Tensiometer (mod. K10) and expressed in dyne/cm.

Printing tests were then made using different printheads fitted on commercially produced printers, with printing frequency of between 2400 and 5000 Hz, ink volumes expelled per drop of between 100 and 200 pl approximately and definition of 300 dots per inch. In particular, Olivetti-produced printheads were used fitted on printer models JP 150 and JP 350, again produced by Olivetti: in this case, the volume of ink expelled for all the tests was preferably of approximately 160 pl, whereas printing frequency was of 3600 Hz in the case of the JP 350 printer and 2400 Hz on the JP 150 printer.

The assessment was made using standard texts printed on 13 commercially-produced reference papers, and in particular assessement was made of general print quality, of definition with particular focus on graphic symbols, of water resistance, of drying speed and of "feathering" (the variously marked tendency of the ink to spread through the fibers of the paper).

For the latter three characteristics, the test methods and assessment criteria were as follows:

water resistance: the test was conducted on standard samples (black areas of 5×5 cm), measuring optical density L* with a SpectroGard-Color System colorimeter in CIElab space before and after immersion for 5 minutes in drinking water, without agitating the sample. Water resistance is then expressed in terms of the difference between the starting values of L* and the values of L* after immersion (DL*);

drying speed: the tests were conducted by measuring the time (in seconds) beyond which the ink printed in a graphic type text cannot be removed by rubbing the printed surface area with a felt cloth;

"feathering": assessment was made of normality of the dot, how rotund it was and the variously marked tendency of the ink to spread through the fibers of the paper; the scale of assessment used was as follows:

5: no "feathering", normal dots;

4: no "feathering", dots slightly less normal;

3: slight "feathering", with a tendency to spread in fibers only when printing special type graphics;

2: marked "feathering";

1: print quality unacceptable due to very obvious "feathering".

By way of illustration, the examples that follow give the exact compositions and the results of some of the formulations tested; drying times, like all the other aspects of print quality assessed, are with reference to printheads, as stated earlier, that use, by way of example, single-drop volumes of approximately 160 pl.

EXAMPLE 1

The ink composition accordance with this invention is as follows:

| | |
|---|---|
| Diethylene glycol | 10.0% by weight |
| Bayscript Schwarz N01 | 2.0% by weight |
| ProJet Fast Black 2 | 0.5% by weight |
| Diethylene glycol mono-hexyl ether | 3.0% by weight |
| Brij HLB 16.9 | 0.5% by weight |
| Brij HLB 12.9 | 0.5% by weight |
| Phosphate buffer | 2.5% by weight |
| Polyethylene glycol 10000 | 5.0% by weight |
| Preventol D6 | 0.1% by weight |
| Deionized water | 75.9% by weight |

The ink with this composition has the following properties:

| | |
|---|---|
| pH | 8 |
| surface tension | 29.6 dyne/cm |
| viscosity | 4.5 mPa × s |
| drying time | 2 s |
| water resistance "feathering" | DL* = 0.2 |
| on Xerographic paper | 3 |
| on recycled paper | 3 |
| definition | good |
| print quality on recycled paper | very good |

Comparison with performance of the "Standard 1" and "Standard 2" ink compositions illustrated previously, reveals considerable improvement when the ink with the mix of 3 surface-active agents in accordance with this invention is used, both in terms of drying time and of water resistance and also, in general, in terms of use of recycled papers.

The mix of 3 surface-active agents in accordance with this invention will, in fact, reduces drying time to around 2 seconds and, at the same time, improves the resistance to water of dyes that are soluble in water, without causing any deterioration of the printing quality (apart from a slightly more marked degree of "feathering" on Xerographic paper, offset by the considerable improvement on recycled papers), nor in the normal operation of the printhead all through the product's lifetime.

In support of this, composition and performance test results are given below of two ink composition, indicated as "Comparison 1" and "Comparison 2", both containing surface-active agent systems different from those illustrated in the foregoing, either because they lack one of the three surface-active agents (Comparison 1) or because they contain a surface-active agent with a HLB lower than the range indicated (Comparison 2):

| | Comparison 1 | Comparison 2 |
|---|---|---|
| Diethylene glycol | 5.0% by weight | 5.0% by weight |
| Food Black 2 | 3.0% by weight | 3.0% by weight |
| Diethylene glycol mono-hexyl ether | | 1.0% by weight |
| Brij HLB 16.9 | 0.8% by weight | 0.8% by weight |
| Brij HLB 4.9 | 0.2% by weight | 0.2% by weight |
| Phosphate buffer | 2.5% by weight | 2.5% by weight |
| Polyetyhlene glycol 10000 | 5.0% by weight | 5.0% by weight |
| Preventol D6 | 0.1% by weight | 0.1% by weight |
| Deionized water | 83.4% by weight | 82.4% by weight |

The inks with these compositions have the following properties:

| | | |
|---|---|---|
| pH | 8 | 8 |
| surface tension | 37.8 dyne/cm | 33.1 dyne/cm |
| viscosity | 1.4 mPa × s | 1.4 mPa × s |
| drying time | 70 s | 60 s |
| water resistance "feathering" | DL* = 20.5 | DL* = 13.9 |
| on Xerographic paper | 3 | 3 |
| on recycled paper | 3 | 1 |
| definition | good | poor |
| print quality on recycled papers | very bad | very bad |

The experiments conducted by the inventors, on the other hand, reveal that using the mix of 3 surface-active agents in accordance with this invention brings good results in any event: further, though not all inclusive, examples of ink compositions in accordance with this invention are illustrated below:

| | Example 2 | Example 3 |
|---|---|---|
| Diethylene glycol | 5.0% by weight | 5.0% by weight |
| Food Black 2 | 3.0% by weight | 3.0% by weight |
| Diethylene glycol mono-hexyl ether | 3.0% by weight | 5.0% by weight |
| Brij HLB 16.9 | 0.5% by weight | 0.75% by weight |
| Brij HLB 12.9 | 0.5% by weight | 0.75% by weight |
| Phosphate buffer | 2.5% by weight | 2.5% by weight |
| Preventol D6 | 0.1% by weight | 0.1% by weight |
| Deionized water | 85.4% by weight | 82.9% by weight |

The inks with these compositions have the following properties:

| | | |
|---|---|---|
| pH | 8 | 8 |
| surface tension | 29.6 dyne/cm | 29.5 dyne/cm |
| viscosity | 1.5 mPa × s | 1.8 mPa × s |
| drying time | 2 s | 2 s |
| water resistance "feathering" | DL* = 11 | DL* = 9,8 |
| on Xerox paper | 3 | 3 |
| on recycled paper | 3 | 3 |
| definition | good | good |
| print quality on recycled papers | very good | very good |

| | Example 4 | Example 5 |
|---|---|---|
| Diethylene glycol | 5.0% by weight | 5.0% by weight |
| Bayscript Schwarz N01 | 2.0% by weight | 2.0% by weight |
| ProJet Fast Black 2 | 0.5% by weight | 0.5% by weight |
| Diethylene glycol mono-hexyl ether | 3.0% by weight | 3.0% by weight |
| Brij HLB 16.9 | 0.5% by weight | 0.5% by weight |
| Brij HLB 12.9 | 0,5% by weight | 0.5% by weight |
| Phosphate buffer | 2.5% by weight | 2.5% by weight |
| Polyvinyl pyrrolidone K15 | 1.0% by weight | |
| Amide | | 10.0% by weight |
| Preventol D6 | 0.1% by weight | 0.1% by weight |
| Deionized water | 84.9% by weight | 75.9% by weight |

The inks with these compositions have the following properties:

| | | |
|---|---|---|
| pH | 8 | 8 |
| surface tension | 29.6 dyne/cm | 29.6 dyne/cm |
| viscosity | 1.7 mPa × s | 2.4 mPa × s |
| drying time | 2 s | 2 s |
| water resistance "feathering" | DL* = 0,1 | DL* = 1.4 |
| on Xerographic paper | 3 | 3 |
| on recycled paper | 3 | 3 |
| definition | average | good |
| print quality on recycled papers | very good | very good |

| | Example 6 | Example 7 |
|---|---|---|
| Diethylene glycol | 5.0% by weight | 5.0% by weight |
| Food Black 2 | 3.0% | |
| Bayscript Schwarz N01 | | 2,0% by weight |
| ProJet Fast Black 2 | | 0.5% by weight |
| Diethylene glycol mono-hexyl ether | 8.0% by weight | 3.0% by weight |
| Brij HLB 16.9 | 1.5% by weight | 0.5% by weight |
| Brij HLB 12.9 | 1.5% by weight | 0.5% by weight |
| Phosphate buffer | 2.5% by weight | 2.5% by weight |
| Preventol D6 | 0.1% by weight | 0.1% by weight |
| Deionized water | 78.4% by weight | 85.9% by weight |

The inks with these compositions have the following properties:

| | | |
|---|---|---|
| pH | 8 | 8 |
| surface tension | 29.6 dyne/cm | 29.6 dyne/cm |
| viscosity | 2.8 mPa × s | 1.5 mPa × s |
| drying time | 2 s | 2 s |
| water resistance "feathering" | DL* = 10.4 | DL* = 1.5 |
| on Xerographic paper | 4 | 3 |
| on recycled paper | 4 | 2 |
| definition | good | poor |
| print quality on recycled papers | very good | very good. |

Ink compositions in accordance with this invention may be prepared by way of the usual laboratory or industrial practices, known in the art; one method of preparation is described by way of example, the steps involved being summarized below:

1—mixing of the three surface-active agents with small amounts of deionized water and subsequent agitation of the mixture for a time of between 5 and 30 minutes, preferably for about 15 minutes, on a slightly heated plate so that temperature of the mixture is maintained between ambient temperature and 50° C.;

2—after all the surface-active agents have been completely dissolved, addition in order of the other components (co-solvent, buffer solution, viscosity modifier and biocide), checking on each occasion stability of the system;

3—addition of the dye (or dyes);

4—dilution to the established percentage using deionized water;

5—agitation of the mixture at ambient temperature for about 1 hour.

What is claimed is:

1. An ink composition for ink-jet printing, comprising a system of at least three non-ionic surface-active agents, wherein at least one of said at least three non-ionic surface-active agents is diethylene glycol mono-hexyl ether; and at least two of said at least three non-ionic surface-active agents are selected from the group consisting of fatty ethoxylate alcohols, nonyl phenol ethoxylate alcohols and a mixture thereof.

2. The ink composition of claim 1, wherein one of said at least three non-ionic surface-active agents has an HLB of between 16 and 18 on the Griffin Hydrophile-Lypophile Balance scale.

3. The ink composition of claim 1, wherein two of said at least three non-ionic surface-active agents have an HLB of between 10 and 14 on the Griffin scale.

4. The ink composition of claim 1, wherein said diethylene glycol mono-hexyl ether is present in the range from about 1 to about 15% by weight.

5. The ink composition of claim 1, wherein said at least two of said at least three non-ionic surface-active agents are each present in the range from about 0.5 to about 3% by weight.

6. The ink composition of claim 1, wherein said at least two of said at least three non-ionic surface-active agents are polyethylene glycol dodecyl ether and polyethylene glycol hexadecyl ether.

7. The ink composition of claim 1, further comprising an aqueous solution, wherein said aqueous solution consists of deionized water and is present in percentages in the range from about 70 to about 90% by weight.

8. The ink composition of claim 1, further comprising a solvent system, wherein said solvent system is selected from the group consisting of glycols of low molecular weight, and a mixture thereof.

9. The ink composition of claim 1, further comprising a solvent system, wherein said solvent system is selected from the group consisting of glycol ethers soluble in water, and a mixture thereof.

10. The ink composition of claim 8 in which the glycols of low molecular weight are ethylene glycol, diethylene glycol, triethylene glycol, propylene glycol, polyethylene glycol 200, pentanediol, hexanediol.

11. The ink composition of claim 9 in which the glycol ethers soluble in water are methyl-, ethyl-, butyl cellosolve, methyl-, ethyl-, butyl carbitol, glycerol, 2-pyrrolidone, N-methyl-2-pyrrolidone, N-(2-hydroxyethyl)-2-pyrrolidone.

12. The ink composition of claim 9, wherein said solvent system is present in the range from about 1 to about 10% by weight.

13. The ink composition of claim 8, wherein said solvent system is diethylene glycol in percentages in the range from about 1 to about 10% by weight.

14. The ink composition of claim 1, further comprising a dye system, wherein said dye system consists of dyes with a solubility in water of more than 4% by weight.

15. The ink composition of claim 14, wherein said dyes are present in percentages in the range from about 0.5 to about 4% by weight.

16. The ink composition of claim 14, wherein said dyes are selected from the group consisting of Food Black 2, C.I. Direct Black 168, azodystuff, disazo dyestuff and a mixture thereof.

17. The ink composition of claim 1, further comprising a pH regulator system, wherein said regulator system is selected from the group consisting of phosphates, borates, carbonates, sodium acetates, potassium acetates, ammonium acetates and a mixture thereof.

18. The ink composition of claim 1, further comprising a viscosity modifier system, wherein said modifier system is selected from a group consisting of polyvinyl pyrrolidone, polyglycols of high molecular weight, amides and mixture thereof.

19. The ink composition of claim 1, further comprising a biocide system, wherein said biocide system is selected from the group consisting of 1,2-benzoisothiazolin-3-one, preparation confining glycol semiformales and isothiazolinones and a mixture thereof.

20. A method of preparing an ink in accordance with claim 1, said method comprising the following steps:

mix said at least three surface-active agents with small amounts of deionized water, agitate the mixture for a time of between 5 and 30 minutes at a temperature of between 20° and 50° C.

21. An ink composition in accordance with claim 1, of the following characteristics:

pH of between 7.5 and 8.5, viscosity between 1.2 and 5 mPa×s @25° C., surface tension of between 25 and 38 dyne/cm 25° C.

22. A printhead for thermal ink-jet printing, comprising a reservoir containing an ink, wherein the composition of said ink is that of any one of the foregoing claims.

23. An ink reservoir for refillable printheads for thermal ink-jet printing, wherein the composition of said ink is that of any one of the claims 1–9.

24. A process suitable for thermal ink-jet printing, comprising the steps of:

having available a thermal ink-jet printer;

having available a printhead including a reservoir containing an ink, fitted on said printer;

depositing on a medium droplets of said ink ejected from said printhead, wherein the composition of said ink is that of any one of the claims 1–9 and from 2–21.

25. The process of claim 24, wherein the volume of said droplets ejected from said printhead is between 100 and 200 pl.

26. The process of claim 24, wherein the volume of said droplets ejected from said printhead is approximately 160 pl.

* * * * *